July 28, 1959

R. W. VOSE 2,896,322

TOOL FOR SHEARING SHEET MATERIAL

Filed Dec. 16, 1957

INVENTOR.
ROBERT W. VOSE
BY
Chapin & Neal
Attorneys

United States Patent Office 2,896,322
Patented July 28, 1959

2,896,322

TOOL FOR SHEARING SHEET MATERIAL

Robert W. Vose, West Springfield, Mass.

Application December 16, 1957, Serial No. 702,913

8 Claims. (Cl. 30—168)

The present invention relates to cutters for shearable metal sheet materials.

Cutting of metal sheet material, and particularly steel sheets of moderate to heavy gauges, has always been a problem, and a problem which is emphasized where the cutting must be done by hand tools. Tin snips are the most familiar tool for this purpose, and it is common knowledge to anyone who has used tin snips, that cutting a straight line is difficult for all but the most expert. Further, the workpiece is necessarily bent, if a long cut is to be made. Also it is difficult to shear heavier gauge materials with conventional tin snips, thus often necessitating the use of cumbersome compound leverage blades.

These cutting problems are further multiplied where the sheet material is in the form of a pipe or closed section. Tin snips are not capable of cutting sections of pipe without at least ruining a very considerable portion of the pipe. This often means a hacksaw must be used to do the cutting on sheet metal pipes and the like. The problems of cutting sheet material with such tools requires great skill and care and thus leaves much to be desired.

The primary object of this invention is to provide an improved sheet metal cutter which minimizes, or eliminates all of the above-mentioned shortcomings of prior art sheet metal cutters.

The above, and other related objects, as well as the various features of the invention will be apparent from a reading of the following description of the disclosure found in the accompanying drawing, and the particular novelty thereof pointed out in the appended claims.

The following description of an improved cutting device of the present invention includes certain features which are of particular advantage in cutting sections of sheet metal pipe and other closed sections of sheet metal. It will, however, be appreciated that various features of the cutter will have general utility in cutting flat sheet material workpieces, as well as curved workpieces, which are not in fact closed sections in the nature of pipe and the like.

Figure 1:
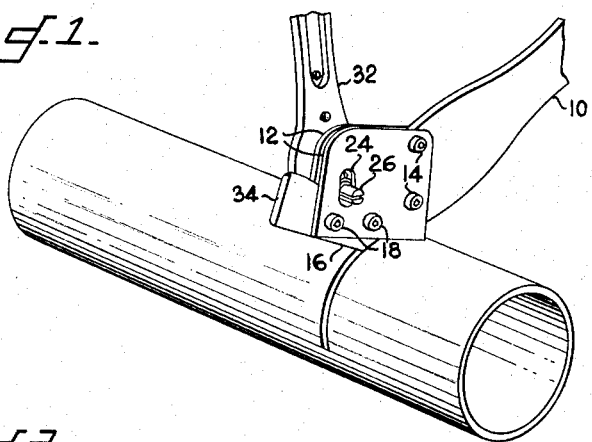
Figure 1 is a perspective view showing the improved cutter of the present invention in operation.
Figure 2:
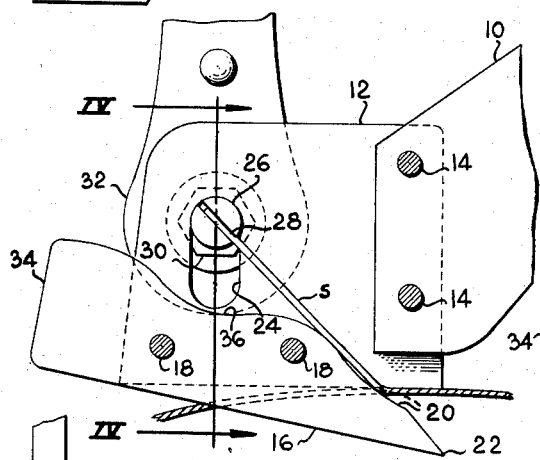
Fig. 2 is a view taken on a cross-section of a pipe as it is being severed by the cutter of Fig. 1, the cutter being in an initial stage of operation, and illustrated on an enlarged scale, with certain portions broken away and others in section.
Figure 3:
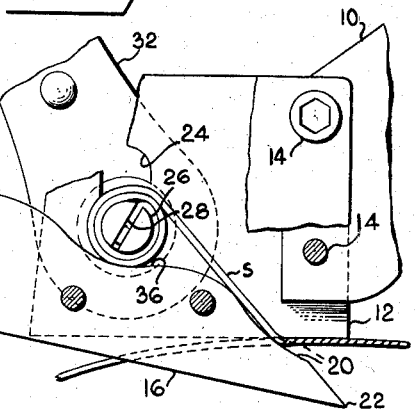
Fig. 3 is a view similar to Fig. 2 showing a further stage of the cutting operation.
Figure 4:
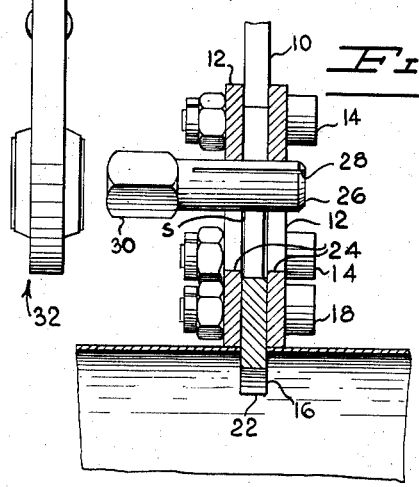
Fig. 4 is a section taken substantially on line IV—IV in Fig. 2.
Figure 5:
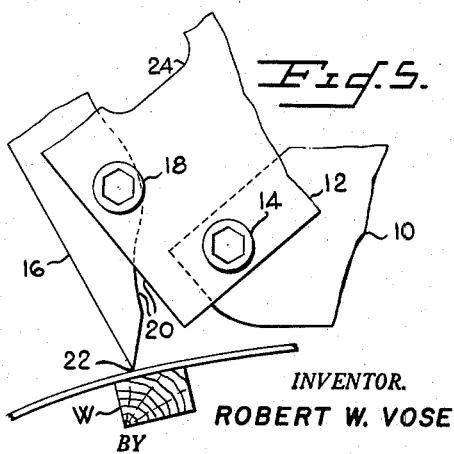
Fig. 5 is a fragmentary view of the cutter illustrating how it may be positioned to start a cut on a section of pipe.

Referring now to the drawing, in Fig. 1 it will be seen that a handle 10 is preferably provided for positioning the present cutter with respect to a workpiece and guiding it during the cutting operation. A pair of plates 12 (Figs. 2, 3 and 4) are secured on either side of the handle 10 by screws 14. Screws 18 secure an intermediate plate 16 between the spaced plates 12, the lower end of plate 16 extending below the matching bottom surfaces of the plates 12, and at an acute angle thereto. This arrangement provides two pairs of vertically spaced shearing edges at 20 for working on the upper and lower surfaces of a work piece, each pair being formed near the intersection of the lower inner edge of one plate 12 with the outer upper edge of the plate 16 against which it is secured (Figs. 2, 3, and 5). These two pairs of vertically spaced edges 20 are laterally spaced apart the thickness of plate 16 as will be evident in considering the spacing between plates as shown by Fig. 4. The edges 20 are formed with sharp corners for effective shearing action and preferably these shearing edges of plate 16 are formed on a concave portion to further increase the effectiveness of the shearing action. The extreme lower end of the plate 16 terminates in a sharp edge or point 22 for reasons which will further appear.

Matching slots 24 are formed in the plates 12 in spaced relation to the shearing edges and upwardly thereof to receive a spindle 26, with the spindle in turn being diametrically slotted, as at 28. It will also be seen that the spindle 26 is provided at one end with a hexagonal head 30, which is readily receivable by a closed end ratchet wrench 32. The wrench 32 and ratcheting means therefor, are well known and available in several commercial forms.

The preferred manner for using the above described cutter in severing a length of sheet metal pipe will now be given. Since the pipe is a closed section, it is first necessary to puncture the pipe at the point where it is desired to make a cut. The cutter may be advantageously positioned with the sharp edge bearing against the pipe in the manner illustrated in Fig. 5. At this point it will be noted that the other end of plate 16 extends beyond the plates 12, to provide a striking surface 34 (Fig. 2), for a hammer. One or two blows of the hammer are usually sufficient to puncture the sheet metal of a pipe, which may, if necessary, be backed up by a block of wood w (Fig. 5). Once the pipe is punctured, the cutter is then swung to the relative position seen in Fig. 2, and a few repeated blows of the hammer, will cause the edges 20 to shear an initial length of a strip s from the sheet material of the pipe. The hammer blows are repeated until the strip s is of sufficient length to intersect the slots 24. The spindle 26 is then introduced into said slots and the strip s captured in the spindle slot 28. The wrench 32 may then be placed on the spindle head 30, and the spindle 26 rotated thereby to wind the strip s thereon. Initially during this winding action, the spindle 26 will be displaced downwardly of the slots 24, until the spindle seats on a concavely curved surface 36, on the upper edge of the intermediate plate 16. Thereafter, and upon continued rotation of the spindle 26, the cutting or shearing edges 20 are forcibly engaged with and advanced around the curved surface of the illustrated pipe. Thus the strip continues to be sheared from the pipe as the cutter is advanced by the pull exerted on the strip s as it is progressively sheared in this manner. The end result, of course, is that a length of pipe is quickly severed upon the cutter being advanced completely around the circumference of the pipe.

It has been found preferable for such sheet materials as medium and heavy gauge steel, that the plates 12 be spaced apart on the order of 3/16 of an inch. With this spacing, assurance is had that there will be at all times a progressive shearing action without any danger of the strip s breaking, as the cutter is advanced.

The inventive concepts herein disclosed provided numerous advantages including the great torque leverage which may be applied to the spindle 26 by the wrench 32; the speed with which a cutting operation may be made by the advantageous use of a ratcheting wrench; the ability to cut a length of pipe into two or more sections with a minimum loss of material and after the fashion of a "tear strip"; as well as other advantages which will be readily apparent to those skilled in the art.

It is, of course, realized that many modifications of the disclosed embodiment may be devised within the spirit and scope of the invention. In this connection, but by no means as a limitation, it would not be necessary to provide the sharp puncturing point 22, where the cutter was to be used on flat workpieces so as to avoid the bending of such workpieces which would otherwise result from the use of conventional tin snips. Furthermore, other means could be employed to draw the strip s in an equivalent manner which would cause the shearing edges 20 to progressively shear a full strip and effect severance of a workpiece.

Having thus described the invention, what is declared to be novel and desired to be secured by Letters Patent of the United States is:

1. A cutter for shearable sheet material, said cutter comprising a pair of spaced plates and an intermediate plate between said spaced plates and having a portion extending below the lower edges of the spaced plates and at an acute angle therewith, the opposed edges of said portion and said spaced plates providing horizontally spaced pairs of shearing edges, each of said pairs of edges being vertically spaced for working on the upper and lower surfaces of a work piece, the shearing edges of said intermediate plate being concavely formed, said intermediate plate terminating in a sharp edge below said spaced plates, the end of said intermediate plate remote from said sharp edge extending beyond said spaced plates to provide a striking surface for a hammer to drive said sharp edge into a workpiece thereby puncturing same and providing for further use of the hammer to force said shearing edges against the punctured edge of the workpiece and force a strip of sheet material between said spaced plates, a handle secured between said plates and angled upwardly in a direction remote from said striking surface, said spaced plates being vertically slotted above said intermediate plate, and a spindle adapted to enter said slots, said spindle being slotted to receive the said strip, said spindle having a head adapted to be received by a ratchet wrench and rotated thereby, to wind said strip on the spindle and draw said shearing edges against said workpiece to progressively shear further strip portions therefrom, thus severing the workpiece.

2. A cutter for shearable sheet material, said cutter comprising a pair of spaced plates, an intermediate plate disposed between said spaced plates and having a portion extending below the lower edges of the spaced plates and at an acute angle therewith, the opposed edges of said portion and said spaced plates providing horizontally spaced pairs of shearing edges, each of said pairs of edges being vertically spaced for working on the upper and lower surfaces of a work piece, the end of said intermediate plate remote from said shearing edges extending beyond said spaced plates to provide a striking surface for a hammer to force said shearing edges against the edge of a workpiece and force a strip of sheet material between said spaced plates, said spaced plates being slotted above said intermediate plate, a spindle adapted to enter said slots, said spindle being slotted to receive the said strip, means for supporting said spindle for rotation, and means for rotating said spindle to wind said strip thereon and draw said shearing edges against said workpiece to progressively shear further strip portions therefrom, thus severing the workpiece.

3. A cutter for shearable sheet material, said cutter comprising a pair of spaced plates, an intermediate plate disposed between said spaced plates and having a portion extending below the lower edges of the spaced plates and at an acute angle therewith, the opposed edges of said portion and said spaced plates providing horizontally spaced pairs of shearing edges, each of said pairs of edges being vertically spaced for working on the upper and lower surfaces of a work piece, said intermediate plate terminating in a sharp edge below said spaced plates, the end of said intermediate plate remote from said sharp edge extending beyond said spaced plates to provide a striking surface for a hammer to drive said sharp edge into a workpiece thereby puncturing same and providing for further use of the hammer to force said shearing edges against the punctured edge of the work piece and force a strip of sheet material between said spaced plates, said spaced plates being apertured above said intermediate plate, a spindle adapted to enter said apertures, said spindle being slotted to receive the said strip and means for rotating said spindle to wind said strip thereon and draw said shearing edges against said workpiece to progressively shear further strip portions therefrom thus severing the workpiece.

4. A cutter for shearable sheet material, said cutter comprising a pair of spaced plates, an intermediate plate disposed between said spaced plates and having a portion extending below the lower edges of the spaced plates and at an acute angle therewith, the opposed edges of said portion and said spaced plates providing horizontally spaced pairs of shearing edges, each of said pairs of edges being vertically spaced for working on the upper and lower surfaces of a work piece, one of said plates providing a striking surface for a hammer to drive said shearing edges against a workpiece and force a strip of sheet material between said spaced plates, said spaced plates being apertured above said intermediate plate, a spindle adapted to enter said apertures, said spindle being slotted to receive the said strip and means for rotating said spindle to wind said strip thereon and draw said shearing edges against said workpiece to progressively shear further strip portions therefrom thus severing the workpiece.

5. A cutter for shearable sheet material, said cutter comprising a pair of spaced plates, an intermediate plate disposed between said spaced plates and having a portion extending below the lower edges of the spaced plates and at an acute angle therewith, the opposed edges of said portion and said spaced plates providing horizontally spaced pairs of shearing edges, each of said pairs of edges being vertically spaced for working on the upper and lower surfaces of a work piece, and means disposed on said cutter for drawing said strip to force said workpiece and said shearing means into cutting engagement, thereby progressively shearing further strip portions therefrom as the workpiece is severed.

6. A cutter for shearable sheet material, said cutter comprising means for puncturing a sheet material workpiece having a closed configuration, means for shearing a strip of sheet material after the workpiece has been punctured, a spindle, and means for winding the strip on said spindle to progressively shear further material from said workpiece in strip fashion to effect severance of the workpiece.

7. A cutter for shearable sheet material, said cutter comprising means for initially shearing a strip of sheet material from a workpiece, a spindle and means for winding said strip of material upon the spindle and progressively shearing further material in strip fashion to effect severance of the workpiece.

8. A cutter for shearable sheet material, said cutter comprising means for shearing a strip of material from a workpiece and means mountable on said cutter for drawing said strip to force said workpiece and said shearing means into cutting engagement, thereby progressively shearing further strip portions therefrom as the workpiece is severed.

References Cited in the file of this patent

UNITED STATES PATENTS

| | | |
|---|---|---|
| 930,292 | Jensen | Aug. 3, 1909 |
| 1,318,859 | Frier | Aug. 14, 1919 |
| 1,468,713 | Frier | Sept. 25, 1923 |
| 1,624,853 | Winter | Apr. 12, 1927 |
| 1,719,449 | Rauke | July 2, 1929 |
| 2,199,380 | Walraven | May 7, 1940 |
| 2,559,291 | Engeln | July 3, 1951 |
| 2,690,218 | Robishaw | Sept. 28, 1954 |
| 2,746,452 | Saylors | May 22, 1956 |
| 2,804,140 | Van Riper | Aug. 27, 1957 |